(12) United States Patent
Rothman et al.

(10) Patent No.: US 8,656,487 B2
(45) Date of Patent: Feb. 18, 2014

(54) SYSTEM AND METHOD FOR FILTERING WRITE REQUESTS TO SELECTED OUTPUT PORTS

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1296 days.

(21) Appl. No.: 11/233,544

(22) Filed: Sep. 23, 2005

(65) Prior Publication Data

US 2007/0073916 A1 Mar. 29, 2007

(51) Int. Cl.
*G06F 12/14* (2006.01)
*G06F 21/82* (2013.01)
*G06F 21/62* (2013.01)

(52) U.S. Cl.
CPC ............................ *G06F 21/82* (2013.01); *G06F 21/62* (2013.01)
USPC ................ 726/21; 726/26; 726/27; 710/36

(58) Field of Classification Search
USPC ........................................... 726/4, 17
See application file for complete search history.

(56) References Cited

U.S. PATENT DOCUMENTS

| | | | | |
|---|---|---|---|---|
| 4,644,495 A | * | 2/1987 | Crane | 345/572 |
| 5,126,728 A | * | 6/1992 | Hall | 726/30 |
| 5,870,467 A | * | 2/1999 | Imai et al. | 705/57 |
| 6,067,585 A | * | 5/2000 | Hoang | 710/11 |
| 6,223,284 B1 | * | 4/2001 | Novoa et al. | 713/100 |
| 6,424,954 B1 | * | 7/2002 | Leon | 705/401 |
| 6,519,647 B1 | * | 2/2003 | Howard et al. | 709/229 |
| 6,572,384 B1 | * | 6/2003 | Marchevsky | 439/43 |
| 6,973,517 B1 | | 12/2005 | Golden et al. | |
| 7,167,958 B2 | * | 1/2007 | Hashimoto et al. | 711/152 |
| 7,356,677 B1 | | 4/2008 | Rafizadeh | |
| 7,373,670 B2 | * | 5/2008 | Mimatsu et al. | 726/27 |
| 7,447,197 B2 | * | 11/2008 | Terrell et al. | 370/360 |
| 7,490,185 B2 | * | 2/2009 | Morishima et al. | 710/113 |
| 2001/0042043 A1 | * | 11/2001 | Shear et al. | 705/51 |
| 2003/0061497 A1 | | 3/2003 | Zimmer | |

(Continued)

FOREIGN PATENT DOCUMENTS

| | | |
|---|---|---|
| CN | 1585927 A | 2/2005 |
| CN | 1620647 A | 5/2005 |
| EP | 1489516 A | 12/2004 |
| WO | 2007/038366 A1 | 4/2007 |

OTHER PUBLICATIONS

PCT International Search Report: International Searching Authority,Jan. 31, 2007, International Application No. PCT/US2006/037141.

(Continued)

*Primary Examiner* — Matthew Henning
(74) *Attorney, Agent, or Firm* — Trop, Pruner & Hu, P.C.

(57) ABSTRACT

Deterring output of data from a computing platform may be accomplished by launching a driver to filter write requests to selected output ports of the computing platform, receiving a write request, and denying the write request when the write request is for a selected output port identified as being in a read-only mode.

18 Claims, 5 Drawing Sheets

(56) References Cited

U.S. PATENT DOCUMENTS

| | | | |
|---|---|---|---|
| 2003/0200454 A1* | 10/2003 | Foster et al. | 713/200 |
| 2003/0226005 A1 | 12/2003 | Wu et al. | |
| 2004/0186947 A1* | 9/2004 | Nagata et al. | 711/103 |
| 2004/0236876 A1* | 11/2004 | Kondratiev et al. | 710/22 |
| 2004/0243823 A1* | 12/2004 | Moyer et al. | 713/200 |
| 2005/0060568 A1* | 3/2005 | Beresnevichiene et al. | 713/200 |
| 2005/0108375 A1 | 5/2005 | Hallak-Stamler | |
| 2005/0120359 A1* | 6/2005 | Shoji et al. | 719/321 |
| 2005/0144405 A1 | 6/2005 | Doran et al. | |
| 2005/0278518 A1 | 12/2005 | Ko et al. | |
| 2005/0289648 A1 | 12/2005 | Grobman et al. | |
| 2006/0080540 A1* | 4/2006 | Arnon et al. | 713/182 |
| 2006/0085629 A1 | 4/2006 | Swanson et al. | |
| 2006/0114817 A1* | 6/2006 | Nishino | 370/216 |
| 2007/0250691 A1 | 10/2007 | Cool et al. | |

OTHER PUBLICATIONS

United States Patent Application Entitled: System, Method and Apparatus to Aggregate Heterogeneous Raid Sets, U.S. Appl. No. 11/394,481, filed Mar. 31, 2006, 23 pages.

Intel Multi-Core Processor Architecture Development Backgrounder, Copyright 2005, 6 pages.

Extensible Firmware Interface Specification, Intel Corporation, Version 1.10, Dec. 1, 2002, 1084 pages.

Extensible Firmware Interface Specification, Version 1.10, Specification Update, Intel Corporation, Version -001, Nov. 23, 2003, 63 pages.

United States Patent and Trademark Office, Office Action issued for U.S. Appl. No. 11/475,626, mailed Jul. 23, 2009, 7 pages.

International Preliminary Report on Patentability received for PCT Application No. PCT/US2006/037141, mailed on Apr. 3, 2008, 7 pages.

* cited by examiner

I/O ACCESS TABLE 300

| I/O PORT | USER ACCESS LEVEL |
|---|---|
| SERIAL | READ/WRITE |
| PARALLEL | NO ACCESS |
| USB | READ ONLY |
| CDROM | READ ONLY |
| FIREWIRE | NO ACCESS |
| HARD DRIVE | READ/WRITE |
| ⋮ | ⋮ |

Figure 3

SYSTEM AND METHOD FOR FILTERING WRITE REQUESTS TO SELECTED OUTPUT PORTS

BACKGROUND

1. Field

The present invention relates generally to computer security and, more specifically, to preventing the unauthorized output of data from a computing platform.

2. Description

Many computing platforms, such as personal computers (PCs), are used for critical data management tasks. Such tasks include managing and manipulating financial, confidential, or other sensitive data. For example, many businesses keep detailed customer lists, which possibly include e-mail addresses, passwords, credit card numbers, identification numbers, and so on. Typical "off the shelf" computing platforms, such as PCs, provide for at least several mechanisms to output data from the platforms. Such mechanisms include input/output (I/O) ports coupled to various types of peripheral devices. Often the computing platforms are owned by a party that does not own the sensitive data, and operated by employees and/or contractors. When sensitive data is being handled, it may be desirable to ensure that the employees who are operating the computing platforms do not have the means to remove the data from the platforms.

BRIEF DESCRIPTION OF THE DRAWINGS

The features and advantages of the present invention will become apparent from the following detailed description of the present invention in which:

FIG. 3 is a diagram of a data structure used to restrict the output of data from a computing platform according to an embodiment of the present invention;

DETAILED DESCRIPTION

Embodiments of the present invention provide a computing platform, such as a mass produced PC, to be configured in such as way as to selectively restrict the output of data. In such embodiments, a system administrator or information technology (IT) employee may configure the software and/or firmware of the computing platform so that operators of the computing platform cannot output data encountered on the platform onto other devices, such as portable storage devices. In effect, the computing platform may be selectively put into a "read-only" mode of operation. This helps to prevent the unauthorized disclosure of sensitive data. In a read-only mode, I/O ports which ordinarily could be used to output data to an external storage device may be isolated. Thus, a standard, mass produced computing platform (e.g., an "off the shelf" PC) can be used in a sensitive data processing capacity, and by modifying a single administrator-controlled setting, switch from a fully enabled read/write deployment to a limited read-only deployment.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
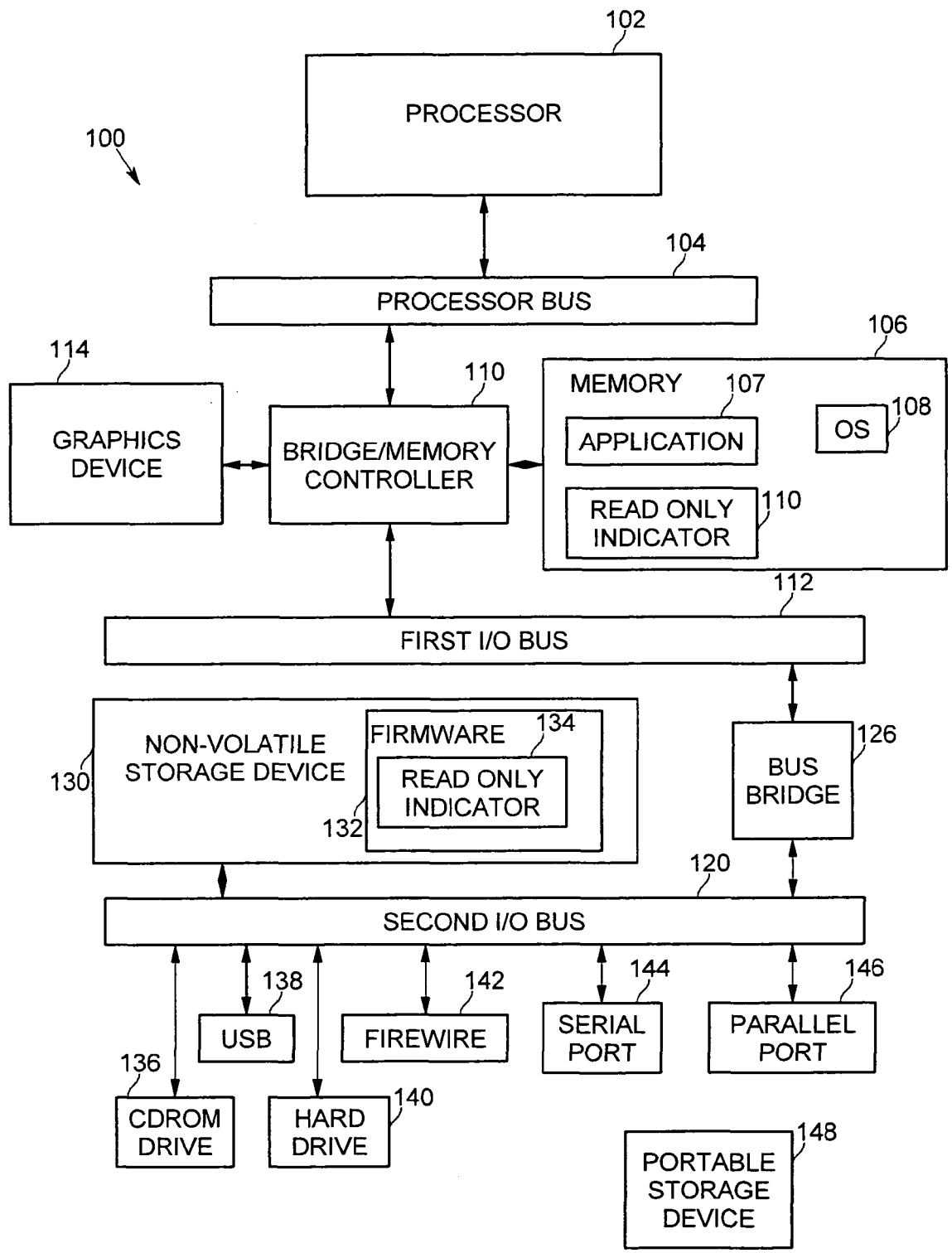
FIG. 1 is a block diagram illustrating a computing platform according to an embodiment of the present invention.

An exemplary computing platform for embodiments of the present invention is shown in FIG. 1, however, other systems may also be used and not all components of the computing platform shown are required for the present invention. Sample system 100 may be used, for example, to execute the processing for embodiments of the present invention. Sample system 100 is representative of processing systems based on the PENTIUM® family of processors and CELERON® processors available from Intel Corporation, although other systems (including personal computers (PCs) or servers having other processors, engineering workstations, other set-top boxes, and the like) and architectures may also be used.

FIG. 1 is a block diagram of a system 100 of one embodiment of the present invention. The system 100 includes at least one processor 102 that processes data signals. Processor 102 may be coupled to a processor bus 104 that transmits data signals between processor 102 and other components in the system 100. System 100 includes a memory 106. Memory 106 may store instructions and/or data represented by data signals that may be executed by processor 102. The instructions and/or data may comprise code for performing any and/or all of the techniques of the present invention. Memory 106 may also contain additional software and/or data such as at least one application program 107 and at least portions of a conventional operating system (OS) 108. Additionally, memory may store at least one data structure called a read only indicator 110. In one embodiment, the read only indicator may be a single bit (i.e., a flag) indicating a read-only mode of operation for the entire computing platform. In another embodiment, the read only indicator may be a data structure specifying further details on what I/O capabilities are currently allowed on the computing platform (e.g., permissions to access selected output ports). In at least one embodiment of the present invention, the read only indicator may be accessed by the OS, but not by the application program or any other user level process. In another embodiment, the application program may be able to read the read only indicator in the registry.

A bridge/memory controller 110 may be coupled to the processor bus 104 and memory 106. The bridge/memory controller 110 directs data signals between processor 102, memory 106, and other components in the system 100 and bridges the data signals between processor bus 104, memory 106, and a first input/output (I/O) bus 112. In this embodiment, graphics device 114 interfaces to a display device (not shown) for displaying images rendered or otherwise processed by the graphics device 114 to a user. First I/O bus 112 may comprise a single bus or a combination of multiple buses. First I/O bus 112 provides communication links between components in system 100.

A second I/O bus 120 may comprise a single bus or a combination of multiple buses. The second I/O bus 120 provides communication links between components in system 100. A bus bridge 126 couples first I/O bridge 112 to second I/O bridge 120. One or more other peripheral devices may be coupled to the second I/O bus. A non-volatile storage device 130 may be coupled to the second I/O bus. The non-volatile storage device (e.g., a flash memory) may include firmware 132, which in some embodiments may comprise a basic input/output system (BIOS) or other computing platform configuration and management program. In one embodiment, the firmware may comprise a read only indicator 134 similar to read only indicator 110, but stored in and accessed from non-volatile storage device 130 rather than memory 106. Other conventional and well known peripherals and communication mechanisms may also be coupled to the second I/O bus, such as compact disk read only memory (CDROM) drive 136, universal serial bus (USB) 138, hard drive 140, FireWire bus 142, serial port 144, and parallel port 146. Portable storage device 148 may be coupled to one of the buses (such as the USB or FireWire bus) to receive data. Portable storage device may comprise a non-volatile flash memory. In a conventional computing platform, any of these devices and buses may be used to output data. In embodiments of the present invention, such output activity may be restricted according, at least in part, to the value of the read only indicator.

Embodiments of the present invention are related to the use of the system 100 as a component in a processing system. According to one embodiment, such processing may be performed by the system 100 in response to processor 102 executing sequences of instructions in memory 106. Such instructions may be read into memory 106 from another computer-readable medium, such as hard drive 140, for example. Execution of the sequences of instructions causes processor 102 to execute processing for the application according to embodiments of the present invention. In an alternative embodiment, hardware circuitry may be used in place of or in combination with software instructions to implement portions of embodiments of the present invention. Thus, the present invention is not limited to any specific combination of hardware circuitry and software.

The elements of system 100 perform their conventional functions in a manner well-known in the art. In particular, hard drive 140 may be used to provide long-term storage for the executable instructions and data structures for embodiments of components in accordance with the present invention, whereas memory 106 is used to store on a shorter term basis the executable instructions of embodiments of components in accordance with the present invention during execution by processor 102.

Figure 2:
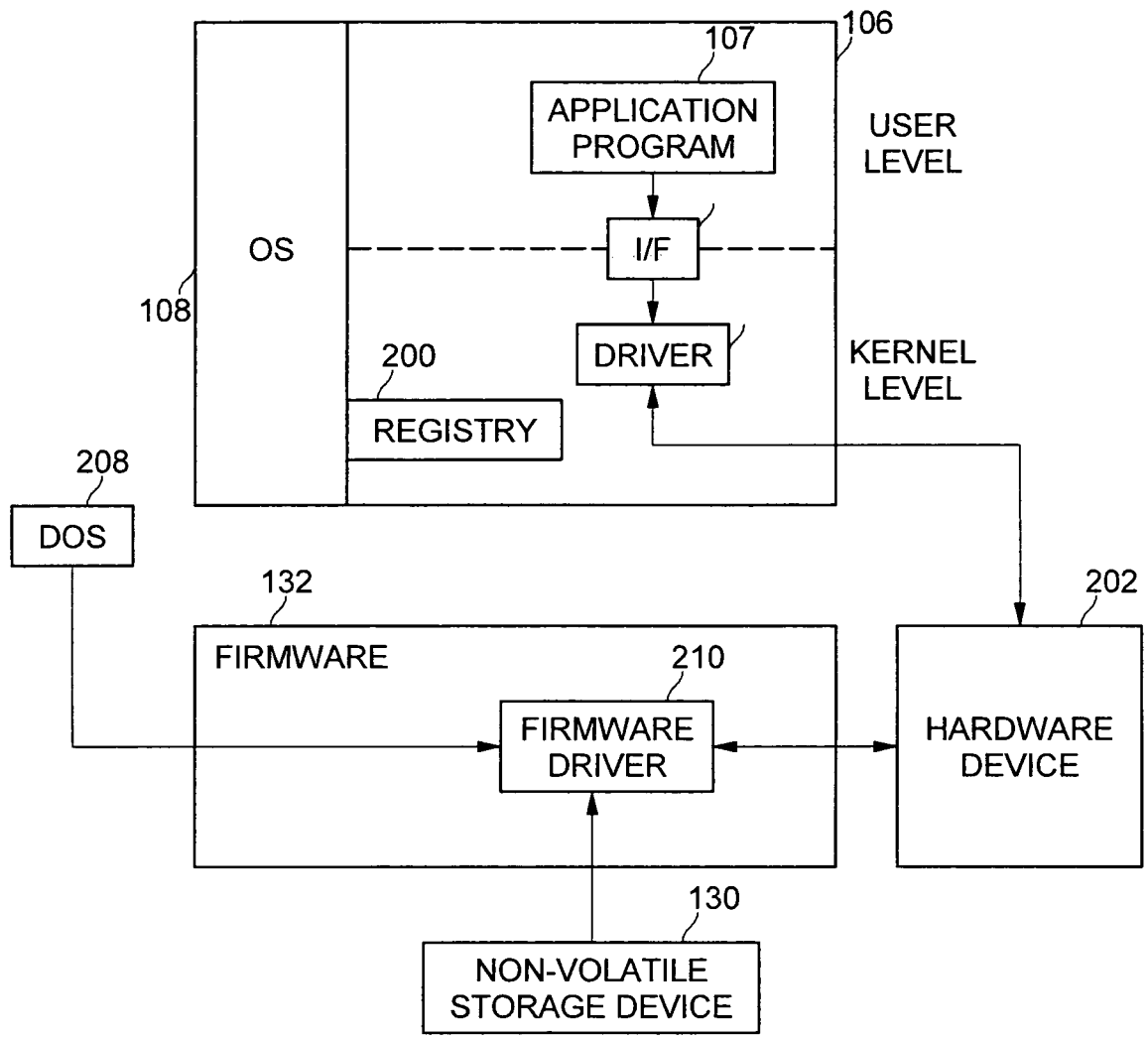
FIG. 2 is a diagram illustrating a software stack in a computing platform according to an embodiment of the present invention.

FIG. 2 is a diagram illustrating a software stack in a computing platform according to an embodiment of the present invention. In one embodiment, the read only indicator may be implemented as a registry setting in registry 200. The OS controls access to the registry and may enforce a policy in well known ways such that only a system administrator for the computing platform can set the read only indicator in the registry. An application program 107 operating at a user level of privilege may desire to output data to hardware device 202. For example, the hardware device may be a portable storage device coupled to the computing platform via a communications bus (not shown in FIG. 2). The application program may call an application program interface (I/F) (API) 204 provided by the OS for requesting write access to the hardware device. The I/F in turn may call driver software module 206 to control the input and output operations with the hardware device. Driver 206 may read the read only indicator within the registry when determining whether to allow a write request to the hardware device. If the read only indicator indicates that the application is not authorized to output data to the hardware device, I/O port, and/or the communications bus specified in the write request (i.e., it is in a read-only mode of operation), the driver denies the write request and declines to output data. If, however, the read only indicator indicates that the application is authorized to output data to the hardware device, then the driver implements the write request with the hardware device. Hence, driver 206 may act as a filter at the kernel level of privilege in determining which write requests submitted by an application program will be granted.

In another embodiment, the computing platform may not be executing an operating system such as Microsoft® Windows®, Linux, or Apple Computer's MacOS®. In this embodiment, the read only indicator may be included as a setup option within firmware 132 and set by a system administrator during computing platform configuration. A user application or command may try to directly call a disk operating system (DOS) function 208 to make a write request directly to the hardware device (bypassing a conventional OS such as Windows, for example). In this case, firmware driver 210, loaded from non-volatile storage device 130, may determine if the write request will be granted according, at least in part, to the status of the read only indicator (contained with the firmware, but not shown in FIG. 2). If a write to a selected output port is not allowed, then firmware 132 does not implement the write request. Instead, a write error may be returned to the requester.

As discussed above, in one embodiment the read only indicator may comprise a flag that is set to either enable write requests or disable write requests. This flag may be a coarse setting for controlling all users and applications programs on the computing platform. For example, if the flag is set, all write requests by all application programs (other than to the display) may be denied. This may not provide the appropriate granularity of control for some situations. In another embodiment, the read only indicator may comprise a data structure called an I/O access table herein that specifies what level of user access is allowed for each I/O port. Driver 206 or firmware driver 210 may access at least one I/O access table when determining whether to allow a user's write request to be granted. One example of a more intricate data structure representing a read only indicator is shown in FIG. 3. In this embodiment, the read only indicator comprises I/O access table 300. A table is shown here, although one skilled in the art will readily recognize that other forms of data structures may also be used. One column of the table contains I/O ports 302, and another column contains user access level values 304. For example, user level access to serial port 306 may be set to read/write 308, user level access to parallel port 306 may be set to no access 312, user level access to USB 314 may be set to read only 316, user level access to CDROM 318 may be set to read only 320, user level access to FireWire 322 may be set to no access 324, and user level access to hard drive 326 may be set to read/write 328. Of course, this is but one example of I/O port access settings, and other settings and alternatives may also be used.

When all I/O ports have user access levels set to read/write, all I/O capabilities for the computing platform are enabled. In one embodiment, this may be the default condition. A system administrator for the computing platform may change the settings in the I/O access table. The ability to make changes to the I/O access table may be protected using well known security measures. By changing the settings in the I/O access table, the system administrator may control what output ports/devices may be accessible to a user of the computing platform.

In this example, access to I/O ports is controlled without regard to which particular user is using the computing platform. In other embodiment, each user may have his or her own I/O access table stored in the registry or firmware. When a particular user is logged in to the computing platform, driver 206 or firmware driver 210 checks the appropriate I/O access table corresponding to the user in order to determine write access to a device. One user's I/O access table may provide for different access values than another user's I/O access table for the same set of devices.

Figure 4:
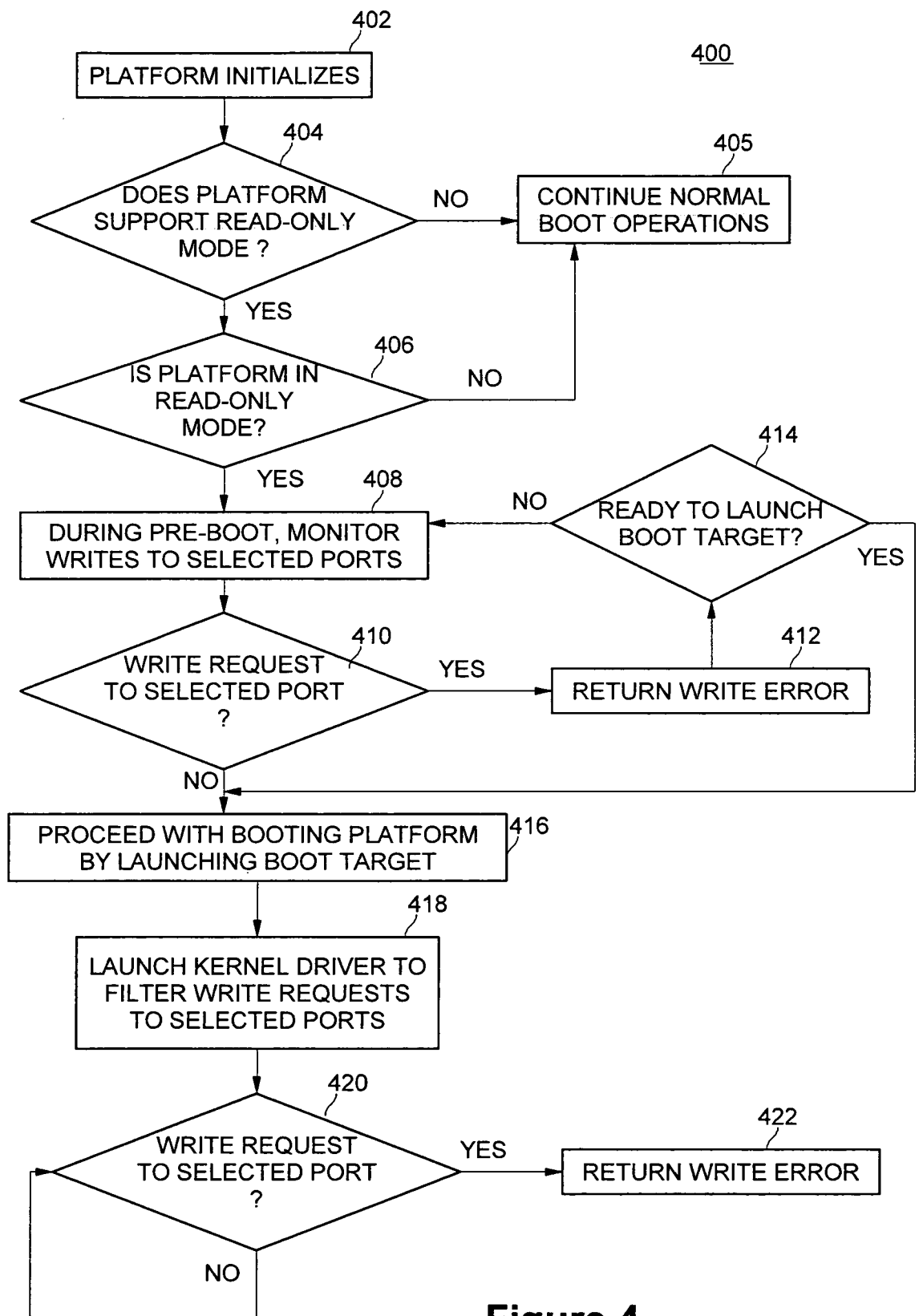
FIG. 4 is a flow diagram illustrating write prevention processing according to an embodiment of the present invention.

FIG. 4 is a flow diagram illustrating write prevention processing 400 according to an embodiment of the present invention. At block 402, the computing platform may commence initialization during a pre-boot stage of processing. At block 404, a check may be made to determine if the computing platform supports a read-only mode of operation. If not, normal boot operations may be continued at block 405. If the platform does support read-only operations, then a check may be made to determine if the platform is currently in a read-only mode by reading the read-only indicator at block 406. If the read-only mode is not set according to the read-only indicator, then normal boot operations may be continued at block 405. Otherwise, during subsequent pre-boot operations, writes to selected ports may be monitored at block 408. When the read-only indicator is a flag, then all output ports may be monitored. When the read-only indicator is an I/O access table, the output ports may be monitored according to the user access level values for the corresponding ports.

At block 410, if a write request is received for output access to a selected port where output is currently not allowed, the write request is not implemented and a write error may be returned to the requester at block 412. If the computing platform is not ready to launch the boot target at block 414, processing continues with additional write access monitoring at block 408. If the computing platform is ready to launch the boot target, then processing continues with block 416. The boot target may be a code image of an OS. At block 416, booting of the platform continues by launching the boot target. The boot target may be obtained locally (i.e., from the hard drive) or remotely (e.g., from another system or device). In at least one embodiment, blocks 402 through 416 occur during the pre-boot stage of computing platform processing.

At block 418, during post-boot processing on the computing platform, in one embodiment kernel drive software 206 may be launched to filter write requests to selected ports according to the read-only indicator. At block 420, if a write request is received for a selected port (i.e., a port not currently allowing write requests), the write request is not implemented and a write error may be returned at block 422. If any received request is not a write request for a selected port, then processing of the driver loops around back to block 420. In at least one embodiment, blocks 418 through 422 occur during the post-boot stage of computer platform processing.

Figure 5:
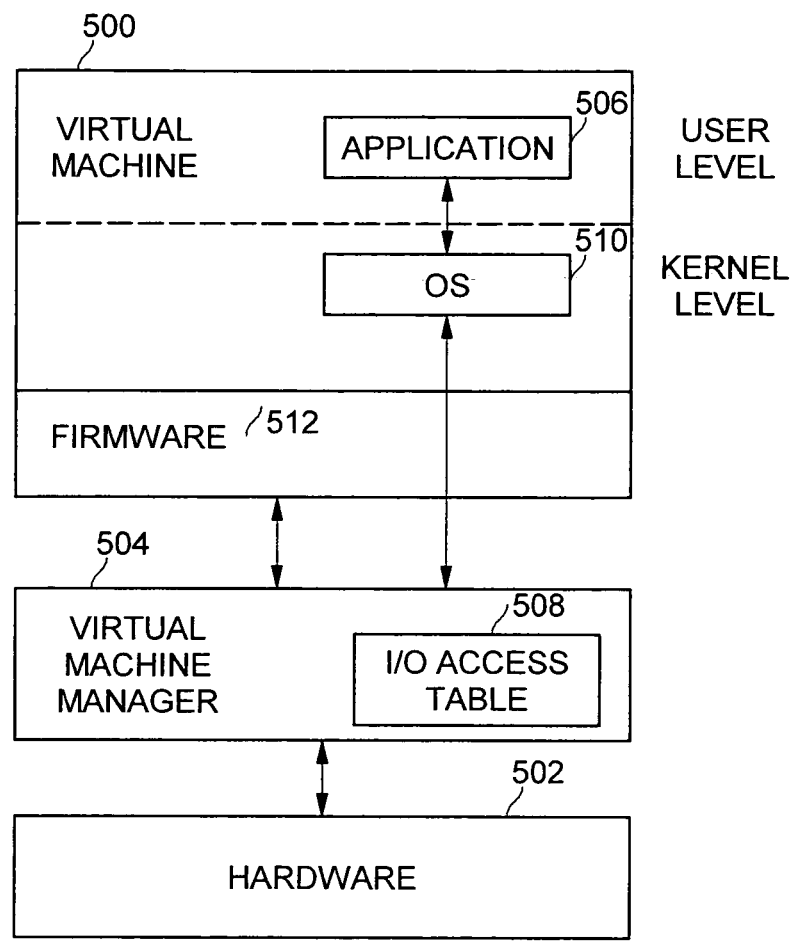
FIG. 5 is a diagram of another embodiment of the present invention.

FIG. 5 is a diagram of another embodiment of the present invention. Some embodiments of the present invention may include virtualization systems. Virtualization is a technique that enables a processor based host machine with support for virtualization in hardware and software, or in some cases, in software only, to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems provide guest software operating in a virtual machine 500 with a set of resources (e.g., processors, memory, IO devices) and may map some or all of the components of a physical host machine (i.e., hardware 502) into the virtual machine, or create fully virtual components. The virtualization system may thus be said to provide a virtual bare machine interface to guest software. In some embodiments, virtualization systems may include a virtual machine monitor (VMM) 504 which controls the host machine. The VMM provides guest software, such as application 506, operating in a virtual machine (VM) with a set of resources such as processors, memory, and IO devices. The VMM may map some or all of the components of a physical host machine into the virtual machine, and may create fully virtual components, emulated in software in the VMM, which are included in the virtual machine (e.g., virtual IO devices). The VMM uses facilities in a hardware virtualization architecture to provide services to a virtual machine and to provide protection from and between multiple virtual machines executing on the host machine. Generally, the memory space in which the VMM operates is a part of host physical memory that is not accessible to any of the virtual machines that are serviced by the VMM. The VMM may control write access by applications to hardware devices.

In this example of using virtualization, a read-only indicator embodied as an I/O access table 508 may be a part of the VMM 504. When an application operating at the user level of privilege wants to write data out to a selected port via hardware 502, the request may be handled by OS 510 and firmware 512 at the kernel level of privilege. The OS calls the VMM to access I/O access table 508 in order to determine if the write request should be implemented. If the user access level for the requested I/O port indicates read-only access, then the write request is denied. In this embodiment, the kernel driver 206 of FIG. 2 may be implemented either in OS 510, firmware 512, or VMM 504. In one embodiment, when the driver is implemented in the VMM, this solution is OS-agnostic. Generation of the I/O access table may be performed during setup processing of the computing platform.

By providing a platform-based mechanism to establish a read-only platform according to embodiments of the present invention, one can now have an "off the shelf" PC deployment in which an employer can reasonably be assured that sensitive data will not be exported from the computing platform. With the ability to configure a read-only platform setting in software and/or firmware, one can take a standard, mass produced PC having all typical output ports and equally deploy such platforms in sensitive areas as well as use them as a standard, fully usable platform. This avoids extra costs in purchasing custom computing platforms constructed for the special purpose of controlling sensitive data.

Although the following operations may be described as a sequential process, some of the operations may in fact be performed in parallel or concurrently. In addition, in some embodiments the order of the operations may be rearranged without departing from the spirit of the invention.

The techniques described herein are not limited to any particular hardware, firmware, or software configuration; they may find applicability in any computing or processing environment. The techniques may be implemented in hardware, firmware, software, or any combination of these technologies. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method comprising:
   upon request, setting a read only indicator to selectively restrict the ability to write data out from a platform while always allowing any data to be viewed;
   checking at boot whether said read only indicator is set;
   launching a driver to filter write requests to output ports of the computing platform;
   intercepting, by the driver, a write request associated with a type of output port from the output ports of the platform;
   comparing, by the driver, the type of output port to an access level value associated with the type of output port;
   denying the write request when the write request is for a selected output port associated with a read-only mode;
   reading the read-only indicator associated with the type of output port to determine authorization of the selected output port to output data; and
   wherein the driver comprises a portion of firmware for the computing platform, the write request is received from a disk operating system (DOS) command, and the read-only indicator is stored as a setup option in firmware.

2. The method of claim 1, wherein the driver comprises a software module executing at a kernel level of privilege and the write request is initiated by an application program executing at a user level of privilege.

3. The method of claim 1, wherein the read-only indicator comprises a data structure listing output ports and corresponding user access level values, and wherein a first user access level corresponding to a first output port comprises at least a read only value.

4. The method of claim 1, wherein the read-only indicator is stored as a registry setting in a kernel-level registry of the computing platform.

5. The method of claim 1, wherein the read-only indicator indicates output permissions for a selected user of the computing platform.

6. The method of claim 1, further comprising:
   initializing the computing platform;
   determining if the computing platform is configured in a read-only mode of operation; and
   during pre-boot processing, receiving write requests to output data from the computing platform and denying the write requests when the read-only mode of operation is indicated.

7. The method of claim 1, wherein the read-only indicator is stored in a virtual machine manager (VMM) in the computing platform, and the VMM includes the driver.

8. A method as defined in claim 1, further comprising allowing the write request when the comparison identifies the write request for the selected output port as being in a read/write mode.

9. A method as defined in claim 1, wherein the output ports comprise at least one of a serial port, a parallel port, or a universal serial bus port.

10. A method as defined in claim 1, wherein the comparison is based on a user associated with the write request.

11. A method as defined in claim 10, wherein the user is associated with a unique pairing of the type of output port and the write request.

12. A system comprising:
    a storage storing a selectively settable read only indicator to selectively restrict the ability of the system to write out data while still allowing any data to be viewed;
    a processor coupled to said storage to check during boot whether said indicator is set;
    the read-only indicator indicating authorization of a selected output port of the computing platform to output data, the read-only indicator to reside in memory storage coupled to the computing platform;
    a driver executing on a processor coupled to the computing platform, the driver to filter write requests to the selected output port by intercepting a write request associated with the selected output port and comparing the selected output port to an access level value associated with the output port to either deny the write request for the selected output port when the selected output port is associated with a read-only mode based on the read-only indicator, or allow the write request when the output port is not identified as being in read-only mode;
    wherein the read-only indicator comprises a data structure listing output ports and corresponding user access level values; and
    wherein the driver comprises a portion of firmware for the computing platform, the write request is received from a disk operating system (DOS) command, and the read-only indicator is stored as a setup option in firmware.

13. The system of claim 12, wherein the driver comprises a software module executing at a kernel level of privilege and the write request is initiated by an application program executing at a user level of privilege.

14. The system of claim 12, wherein the user access level values comprise at least a read only value.

15. The system of claim 12, wherein the read-only indicator is stored as a registry setting in a kernel-level registry of the computing platform.

16. The system of claim 12, wherein the read-only indicator indicates output permissions for a selected user of the computing platform.

17. The system of claim 12, further comprising firmware to initialize the computing platform, determine if the computing platform is configured in a read-only mode of operation; and during pre-boot processing, receive write requests to output data from the computing platform and deny the write requests when the read-only mode of operation is indicated.

18. The system of claim 12, wherein the read-only indicator is stored in a virtual machine manager (VMM) in the computing platform, and the VMM includes the driver.

* * * * *